United States Patent [19]
Lehman

[11] Patent Number: 5,102,674
[45] Date of Patent: Apr. 7, 1992

[54] DEEP FAT COOKING PROCESS

[76] Inventor: Thomas Lehman, 208 SW. Rogers Dr., Lee Summit, Mo. 64801

[21] Appl. No.: 739,916

[22] Filed: Aug. 2, 1991

Related U.S. Application Data

[62] Division of Ser. No. 596,716, Oct. 10, 1990.

[51] Int. Cl.⁵ .............................. A23L 1/00; H05B 1/00
[52] U.S. Cl. ................................... 426/233; 426/438; 426/523
[58] Field of Search .............. 426/231, 233, 438, 523; 99/330, 331, 403; 126/374; 219/492, 494, 497

[56] References Cited

U.S. PATENT DOCUMENTS 4,623,544 11/1986 Highnote ............................ 426/233
4,913,038 4/1990 Burkett et al. ...................... 99/331

*Primary Examiner*—George Yeung
*Attorney, Agent, or Firm*—Head & Johnson

[57] ABSTRACT

A process to control and regulate the temperature of a cooking medium in a deep fat fryer having a receptacle used for batch frying of food. The process includes inputting a desired set cooking temperature through use of a keyboard connected to a microprocessor. The actual temperature of the cooking medium within the receptacle is sensed. The actual temperature is compared to a referenced temperature and the rate of change of the actual temperature is calculated. The temperature readings are translated from analog to digital readings. A proportioning temperature band having a top and bottom temperature is established. Proportional, periodic power is delivered to a heating element in the receptacle if the actual temperature is within the proportioning temperature band. The rate of change of the actual temperature is multiplied by a constant and the resultant figure is added to the actual temperature. The result is then compared to the set temperature and power is switched on if below the set temperature, and power is switched off if the result is above the set temperature.

3 Claims, 3 Drawing Sheets

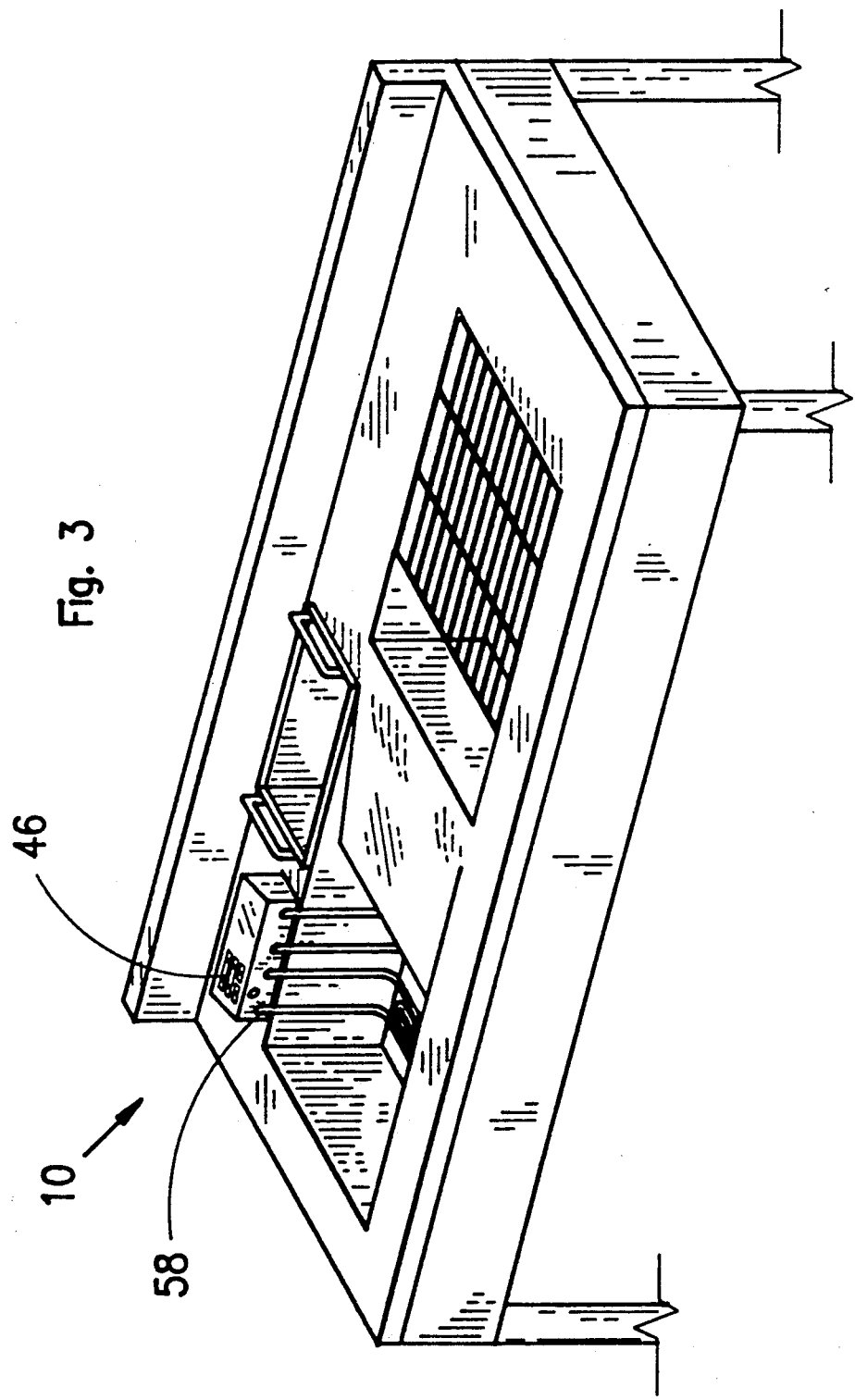

DEEP FAT COOKING PROCESS

This is a divisional of copending application Ser. No. 07/596,716 filed on Oct. 10, 1990.

BACKGROUND OF THE INVENTION

1. Field of the Invention

The present invention relates to a deep fat food fryer wherein accurate temperature control of the cooking medium during the cooking process is desirable and wherein quick response to changes in the temperature of the cooking medium is desirable.

2. Prior Art

In deep frying of certain foods, accurate temperature control is important. In cooking donuts, for instance, it is important to maintain the desired temperature of the cooking medium through the entire cooking time.

In the past, simple mechanical on and off thermal controllers have been used to control the temperature of the cooking medium such as cooking oil. They would turn off when the cooking medium reached a certain temperature and turn back on when the temperature dropped below a given, slightly lower temperature. Hence, the temperature was never stable. Fluctuations of 10° or more were not uncommon. To improve on this situation, proportioning controllers were introduced.

Proportioning controllers vary the amount of power reaching the heating element by turning the heating element on and then off periodically. The ratio of "on" time to the total time or period is known as the duty cycle. By adjusting the duty cycle or percentage of "on" time, the amount of heat generated by the heating element can be controlled. For example, if 6% heat is desired, the heater could be turned on for 6 seconds and off for 94 seconds. The period would be 100 seconds. By adjusting the percentage of "on" time, the power received by the heating element can then be continuously adjusted.

Existing proportioning type thermal controllers give precise temperature control if the load is steady. The proportioning band will be set so that if the temperature is below the band, the heater is on all the time. Conversely, if the temperature is above the proportioning band, the heater is off. If the temperature is within the band, the proportioning mechanism is activated and the following formula is used to set the heater duty cycle.

$$\frac{\text{Band top minus Actual Temperature}}{\text{Proportioning Band Width}} = \text{Duty Cycle}$$

It will be appreciated that as the actual temperature drops, the duty cycle will increase. Accordingly, a slight drop in temperature causes a slight increase in heating. Eventually, an equilibrium will be reached and the temperature will change very little. This assumes that the lag time is short. In other words, the period is short compared to the time it takes additional heat from the heating element to increase the actual temperature reading.

If the proportioning band width is too narrow (a small number of degrees), the actual temperature will overshoot and continue to oscillate around the proportioning band. Conversely, if the proportioning band width is too wide (a large number of degrees), the actual temperature will be allowed to fluctuate widely with load within the band. Hence, there is a natural limit to how closely a proportioning controller can hold the actual temperature to the desired set point.

Applicant is aware of the following U.S. patents:

| U.S. Pat. No. | Patentee | Issue Date |
|---|---|---|
| 3,626,840 | Day | 1971 |
| 4,549,527 | Davis | 1985 |
| 4,812,625 | Mario Ceste, Sr. | 1989 |
| 4,663,710 | Waugh et al. | 1987 |
| 4,278,872 | Koether et al. | 1981 |

Accordingly, it is a principal object and purpose of the present invention to provide a temperature control system for a deep fat fryer that will accurately control the temperature of the cooking medium during the cooking process and will quickly respond to changes in the temperature of the cooking medium.

SUMMARY OF THE INVENTION

The heating and control mechanism for the deep fat fryer includes a thermocouple which would be immersed in a cooking medium. The thermocouple is wired to an analog multiplexer. An internal thermometer is also connected to the analog multiplexer. A reference voltage is wired to the analog multiplexer to establish a reference temperature against which the actual temperature is compared. A sample and hold mechanism is wired to the multiplexer and would be periodically charged with voltages.

An analog to digital converter converts the voltages from the sample and hold mechanism to digital readings. The ensuing signals are amplified and, in turn, wired to a microprocessor.

Input data and instructions are delivered to the microprocessor by a keyboard. A display board is also connected to the microprocessor. The microprocessor is wired to a number of SCRs (silicon controlled rectifier) in an SCR board.

At least one electric heating element is connected to a power source in series with the SCR board. A mechanical contactor is also provided which is turned on when the unit is turned on.

The device constantly monitors the actual temperature of the cooking medium and, in combination with the timer, the rate of change of the actual temperature, or the slope. A desired, set temperature is input in the microprocessor and a proportioning temperature band is established surrounding the set temperature. If the slope is small and the actual temperature is within the proportioning band, the unit will operate to deliver proportional, periodic power.

If the actual temperature is above the proportioning band, then the heating element will be turned off.

The rate of change of the actual temperature is multiplied by a constant and then added to the current temperature. If this resultant number is above the set temperature, the heating elements are turned off. If this number is below the set temperature, the heating elements are turned on at full power. Use of this procedure will provide quicker reaction to a change in temperature of the cooking medium. Additionally, the tendency to overshoot or undershoot the set temperature will be reduced.

BRIEF DESCRIPTION OF THE DRAWINGS

FIG. 3 is a perspective view of a deep fat fryer of the present invention.

DETAILED DESCRIPTION OF THE PREFERRED EMBODIMENTS

Figure 1:
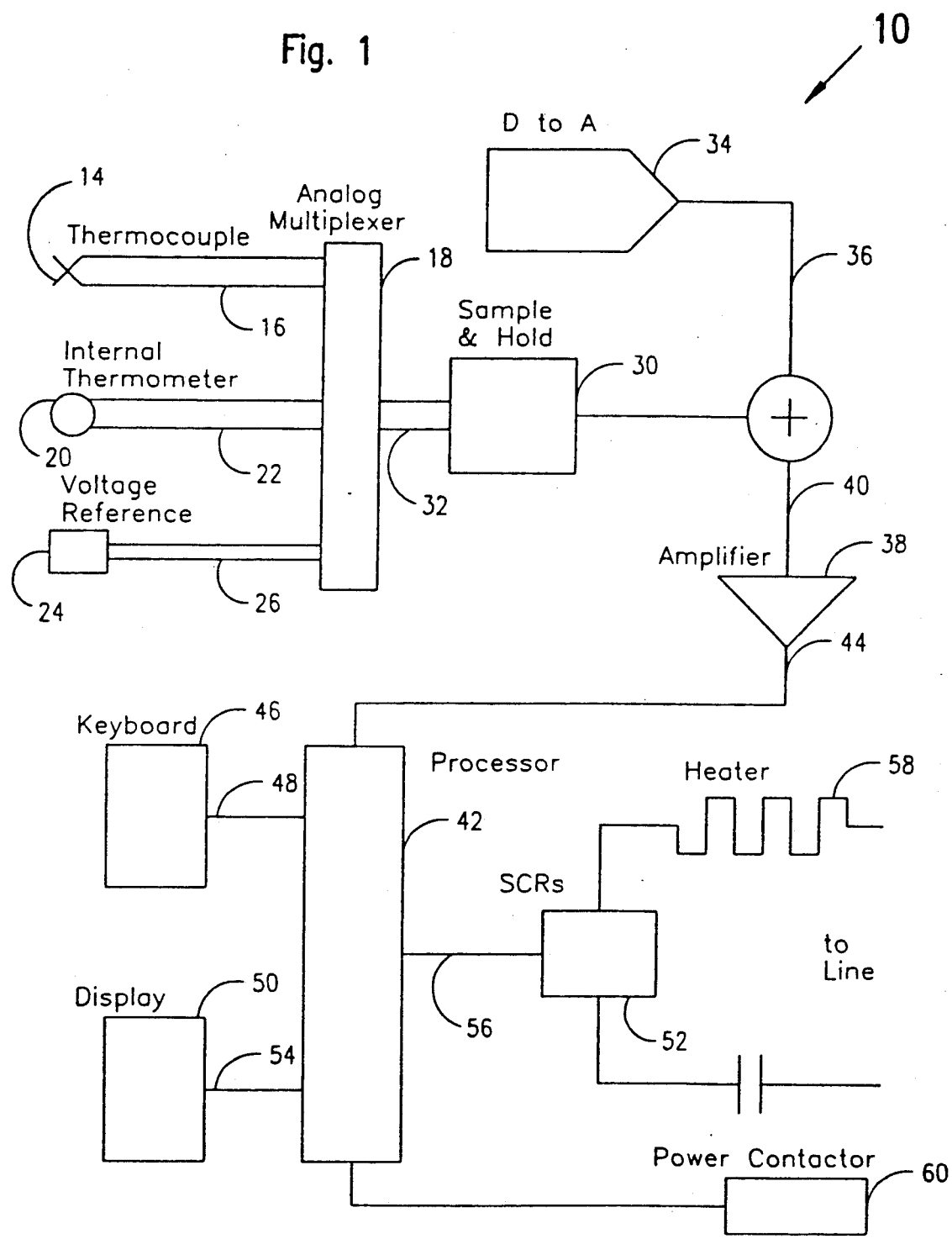
FIG. 1 is a block diagram of the present invention.

Referring to the drawings in detail, FIG. 1 is a block diagram showing the features and components of the present invention.

The system of controlling the temperature of the deep fat fryer as disclosed in the present invention has application to a variety of fryers, however, it is particularly appropriate for fryers where accurate control of the temperature of the cooking medium is important.

One type of food fryer which might utilize the present invention would be in commercial food preparation establishments such as bakeries and carry-out shops. A receptacle is generally provided for holding the cooking medium, such as cooking oil. At least one heating element, which may be removed for cleaning or servicing, is disposed in the receptacle for heating the cooking medium.

One such food fryer is shown in U.S. Pat. No. 3,626,840 to Day. A work table has a horizontal table top with three receptacles. One receptacle is the cooking vessel for holding the cooking medium, such as cooking oil, and has vertical side walls. Racks having handles may be lowered into the receptacle. The other receptacles are for racks and for a reservoir of another liquid.

In the present heating and control mechanism 10, a thermocouple 14 would be immersed in the cooking medium (not shown). The thermocouple senses differences in temperatures. The thermocouple would be wired by line 16 to an analog multiplexer 18. An internal thermometer 20 would be connected by line 22 to the analog multiplexer.

As is known, a reference voltage 24 wired to the analog multiplexer by line 26 may be utilized to establish a reference temperature against which the actual temperature is compared.

A sample and hold mechanism 30 is wired to the analog multiplexer 18 by lines 32. The sample and hold mechanism, a standard device, includes a capacitor which will be periodically charged with voltage received from the multiplexer. This mechanism provides for stability in utilizing the analog to digital conversion mechanism.

An analog to digital converter 34 (labelled D to A) converts the voltages from the sample and hold mechanism to digital readings. In the present embodiment, readings to the nearest one quarter degree are made. The analog to digital mechanism is connected to the sample and hold mechanism by line 36. The ensuing signal is amplified at amplifier 38 connected via line 40. The amplifier is, in turn, wired to a microprocessor 42 by a line 44. The microprocessor includes rom, rom and a timer. In the present embodiment, a single chip microprocessor has been utilized, although other types of processors might be utilized Input data and instructions may be delivered to the microprocessor by a keyboard 46 connected to the microprocessor by line 48. For convenience, the keyboard might be located along the tabletop for ease of use. In the present embodiment, a nine key keyboard is provided for operation by an attendant. Three keys are provided for 3 preset temperatures for different food products—in this case, three different kinds of donuts. An additional key—labeled "SET"—is used for setting a desired temperature. The temperature can be changed by pressing "up" or "down" arrows. A key labeled "PRE-MELT" will set the temperature to 250° F. The proportional controller limits the maximum power output to 8% so that solid shortening would be melted without overheating in spots.

A display board 50 is also connected to the microprocessor 42 by line 54. The actual, current temperature of the cooking medium is displayed.

The microprocessor 42 is wired to a number of SCRs (silicon controlled rectifier) in an SCR board 52 or similar device by line 56.

An electric heating element 58 is connected to a power source or line in series with the SCR board 52. The heating element 58 is of the electrical resistance variety. In the present embodiment, two 240 volt AC, 5500 watt heating elements are utilized.

A mechanical contactor 60 is provided which is turned on when the unit is turned on by an on/off switch at the keyboard 46.

Figure 2:
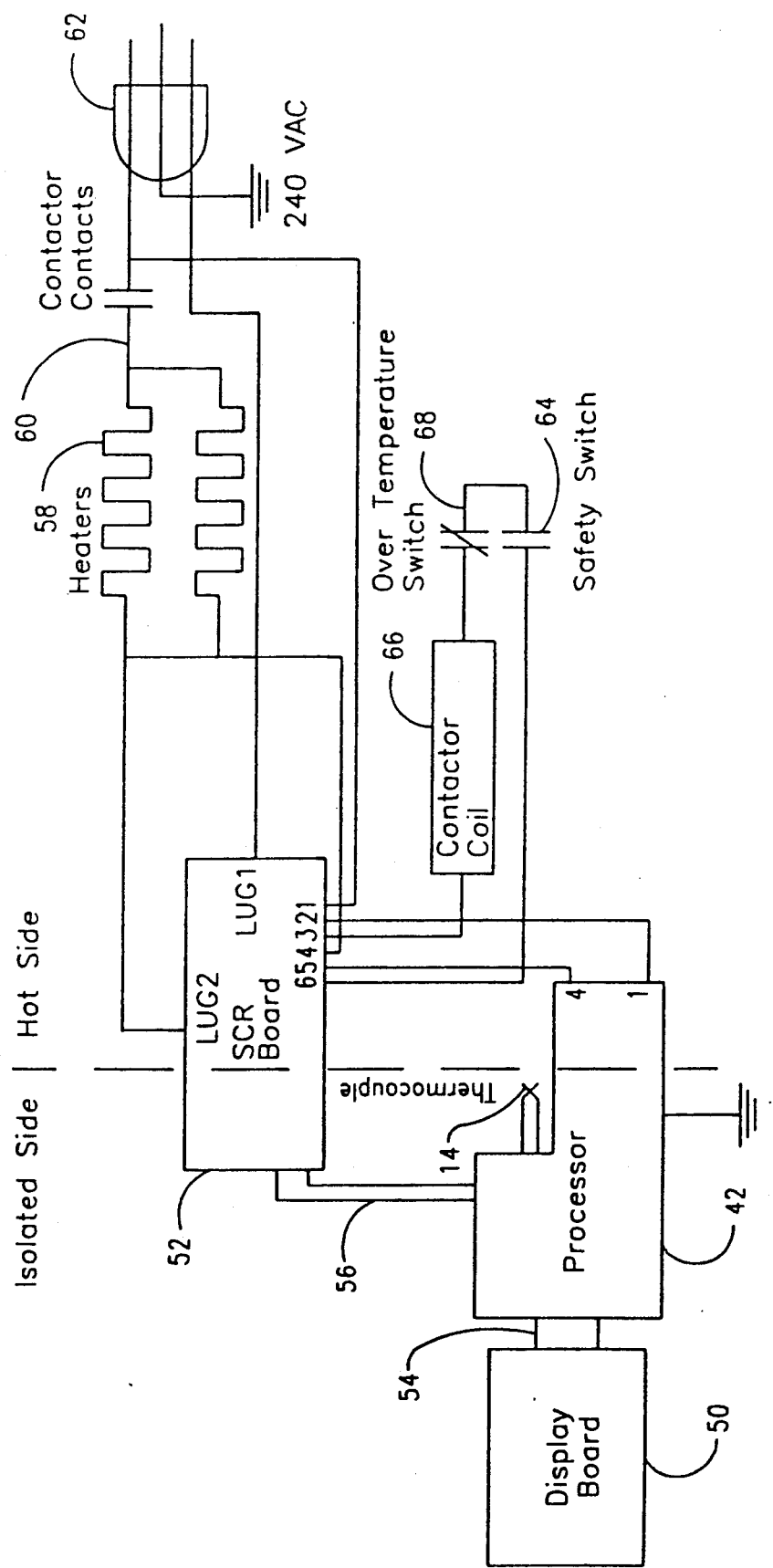
FIG. 2 is a simplified schematic diagram of the present invention.

FIG. 2 shows a simplified schematic diagram of the present invention. The microprocessor board 42 is wired to the display board 50 by lines 54. The thermocouple 14 is shown connected to the processor.

The SCR board 52 is juxtaposed between the heating elements 58 and the processor board 42.

Power to the device is supplied by a 240 volt AC power source 62. For power to reach the heating elements 58, it must pass through the SCR board 52 and the mechanical contactor 60.

To help prevent accidentally turning the unit on, a safety switch 64 with a contactor coil 66 is wired to the SCR board 52. When the unit is properly mounted and installed, this switch will be depressed. There is also an over-temperature switch 68 wired in series with the contactor coil 66. The bulb (not shown) which activates this switch is mounted near the heating elements 58. Should the bulb temperature exceed a predetermined trip point, the over-temperature switch 68 will open, turning the contactor off. An operator must then manually reset the switch before power can again be applied to the heating elements 58.

The present invention utilizes a unique controlling mechanism to accurately control the temperature of the cooking medium. The device constantly monitors the actual temperature of the cooking medium and, in combination with the timer, the rate of change of the actual temperature, or the slope.

For purposes of explanation, a proportioning temperature band of three degrees above and three degrees below the set temperature is established. If the slope is small (the temperature is not changing very fast) and the actual temperature is within three degrees of the set temperature, the unit will operate to deliver proportional, periodic power. The heating elements are turned off and then on periodically.

If the actual temperature is above the set temperature plus three degrees, then the heating elements 58 will be turned off.

Otherwise, a modified technique is utilized which works extremely well in controlling the actual temperature without overshooting the desired temperature. In short, the rate of change of the temperature is multiplied by a constant and then added to the current temperature. If this resultant number is above the set temperature, the heating elements are turned off. If this number is below the set temperature, the heating elements are turned on at full power. The constant number may be adjusted to achieve a desired temperature. In the present embodiment, the constant number has been set so that no overshooting or undershooting of the temperature will occur and the cooking medium will reach the desired temperature in the absolute minimum period of time. The constant number is determined by trial and error technique, however, it is related to the heating capacity of the cooking medium, in this case, cooking oil.

A procedure is also utilized to determine the top of the proportioning temperature band which takes into account that the hotter the cooking medium, the greater the heat loss to the atmosphere. Initially, the temperature difference between atmospheric temperature and the cooking medium is measured. The difference is multiplied by a constant. The result is then added to the desired set temperature.

The following example illustrates the use of the temperature control technique. When the device is first connected to the power source, the processor goes through a self-check or initialization procedure for approximately 10 seconds. Thereafter, the unit may be turned on. After the unit has been turned on for a period of time and the cooking medium has been warmed, the temperature is stable and the unit is proportioned within the proportioning band. At this point, the slope is near zero and the actual temperature nearly equals the set temperature. Then, a cold batch of food products will be lowered into the cooking medium. Before the actual temperature has dropped a full degree, the slope will become extremely negative and the unit will stop proportioning. The slope, which is negative, will be multiplied by the constant and added to the actual temperature. This figure will then be compared with the set temperature. Since it will be lower than the set temperature, the heating elements will be turned on at full power. As the cold food product cooks, the temperature will stay down, leaving the heating elements on all the time.

Once the batch is removed from the cooking medium, the actual temperature will start to rise quickly. The slope becomes positive and again will be multiplied by the constant and added to the actual temperature. As long as this number is below the set temperature, the heating elements will remain on at full power all the time. When this number exceeds the set temperature, the heating elements will be turned off. In the present example, the heating elements are turned off approximately nine degrees before the set temperature has been reached. This technique will keep the heating elements off as the actual temperature rises and coasts upward. A short time thereafter, the actual temperature will be within three degrees of the set temperature and the slope will be low, near zero. The proportioning mechanism will then take over to maintain the temperature of the cooking medium within three degrees of the set temperature.

The present invention provides a fryer that has quicker temperature recovery than in existing proportioning controllers. In existing controllers, when a cold batch of food is lowered into the cooking medium, the actual temperature of the cooking medium must increase outside of the proportioning band before the heaters are turned on at full force. By utilizing the technique described herein, the heating elements will come on at full force quicker-as soon as the slope becomes negative to a great degree.

Whereas the present invention has been described in relation to the drawings attached hereto, it should be understood that other and further modifications, apart from those shown or suggested herein, may be made within the spirit and scope of this invention.

What is claimed is:

1. A method to control and regulate the temperature of cooking medium in a deep fat fryer used for batch frying of food, said fryer having a receptacle for cooking, which method comprises:
   a. inputting a desired set cooking temperature on a keyboard connected to a microprocessor;
   b. sensing the actual temperature of cooking medium within said receptacle;
   c. comparing the actual temperature sensed to a referenced temperature and calculating the rate of change of the actual temperature;
   d. translating said actual temperature and said reference temperature from analog to digital reading;
   e. establishing a proportioning temperature band surrounding said set temperature having a top and bottom temperature;
   f. delivering proportional, periodic power to a heating element in said receptacle if the actual temperature is within said proportioning temperature band and the rate of change is small;
   g. multiplying the rate of change of actual temperature by a constant to arrive at a product and adding the actual temperature to the product for a resultant temperature; and
   h. comparing the resultant temperature to the set temperature and switching on power if the resultant temperature is below said set temperature and switching off power if the resultant temperature is above the set temperature.

2. A method to control and regulate the temperature of cooking medium in a deep fat fryer used for batch frying of food, said fryer having a receptacle for cooking, which method comprises:
   a. inputting a desired set cooking temperature on a keyboard connected to a microprocessor;
   b. sensing the actual temperature of said cooking medium within said receptacle;
   c. comparing the actual temperature sensed to a referenced temperature and calculating the rate of change of the actual temperature;
   d. establishing a proportioning temperature band surrounding said set temperature having a top and bottom temperature;
   e. delivering proportional, periodic power to a heating element in said receptacle if the actual temperature is within said proportioning temperature band and the rate of change is within a specified amount;
   f. multiplying the rate of change of actual temperature by a constant to arrive at a product and adding the actual temperature to the product for a resultant temperature; and
   g. comparing the resultant temperature to the set temperature and switching on power if the resultant temperature is below said set temperature and switching off power if the resultant temperature is above the set temperature.

3. A method to control and regulate the temperature of cooking medium in a deep fat fryer as set forth in claim 2 wherein said actual and said reference temperatures are translated from analog to digital.

* * * * *